US012731209B2

(12) United States Patent
Tang

(10) Patent No.: US 12,731,209 B2
(45) Date of Patent: Sep. 8, 2026

(54) IMAGE PROCESSING METHOD, APPARATUS, DEVICE AND STORAGE MEDIUM

(71) Applicant: Beijing Zitiao Network Technology Co., Ltd., Beijing (CN)

(72) Inventor: Qiuhu Tang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 183 days.

(21) Appl. No.: 18/682,401

(22) PCT Filed: Aug. 3, 2022

(86) PCT No.: PCT/CN2022/109922

§ 371 (c)(1),
(2) Date: Feb. 8, 2024

(87) PCT Pub. No.: WO2023/016310

PCT Pub. Date: Feb. 16, 2023

(65) Prior Publication Data

US 2024/0346724 A1 Oct. 17, 2024

(30) Foreign Application Priority Data

Aug. 13, 2021 (CN) ........................ 202110931865.X

(51) Int. Cl.
*G06T 11/60* (2026.01)
*G06T 3/40* (2006.01)
(Continued)

(52) U.S. Cl.
CPC ................ *G06T 11/60* (2013.01); *G06T 3/40* (2013.01); *G06T 7/11* (2017.01); *G06V 10/761* (2022.01); *G06T 2207/20016* (2013.01)

(58) Field of Classification Search
CPC ........... G06V 10/761; G06T 3/40; G06T 7/11; G06T 2207/20016; G06T 5/00; G06T 11/60; G06T 11/40
See application file for complete search history.

(56) References Cited

U.S. PATENT DOCUMENTS 6,137,904 A * 10/2000 Lubin ....................... G06T 5/50 382/162
2008/0253678 A1* 10/2008 Li .......................... G06V 10/30 382/270

(Continued)

FOREIGN PATENT DOCUMENTS

CN 1731449 A 2/2006
CN 103679680 A 3/2014

(Continued)

OTHER PUBLICATIONS

International Search Report and Written Opinion in PCT/CN2022/109922, mailed Oct. 25, 2022, 14 pages.

(Continued)

*Primary Examiner* — Phi Hoang
(74) *Attorney, Agent, or Firm* — Astute IP Law Group

(57) ABSTRACT

The present disclosure provides an image processing method, an apparatus, a device and a storage medium. The method includes: based on a smear region in an image to be processed, by taking a target image as an image of a bottom layer, an image pyramid is constructed for the target image; in an order from a top layer to the bottom layer, a matching updating process is performed on an image of each layer in the image pyramid, sequentially; a target patch corresponding to a patch to be matched is determined on the input image of the current layer based on similarity matching; the input image of the current layer is updated based on the target patch; based on an updated image corresponding to (Continued)

a b the image of the bottom layer in the image pyramid, a target effect image corresponding to the image to be processed is generated.

20 Claims, 4 Drawing Sheets

(51) Int. Cl.
*G06T 7/11* (2017.01)
*G06V 10/74* (2022.01)

(56) References Cited

U.S. PATENT DOCUMENTS

| | | | | |
|---|---|---|---|---|
| 2014/0177974 | A1* | 6/2014 | Park | G06T 5/77<br>382/275 |
| 2018/0139377 | A1* | 5/2018 | Zhang | G06V 40/161 |
| 2019/0356844 | A1* | 11/2019 | Zhang | A61B 5/442 |

FOREIGN PATENT DOCUMENTS

| | | | |
|---|---|---|---|
| CN | 106327449 | A | 1/2017 |
| CN | 108665416 | A | 10/2018 |
| KR | 10-2016-0115068 | A | 10/2016 |

OTHER PUBLICATIONS

Liu et al., "Hierarchical Guidance Strategy and Exemplar-Based Image Inpainting", Information, Article No. 96, vol. 9, No. 4, Apr. 18, 2018, 13 pages.

Office Action for Chinese Patent Application No. 202110931865.X, mailed on May 23, 2026, 20 pages.

* cited by examiner

A

B

IMAGE PROCESSING METHOD, APPARATUS, DEVICE AND STORAGE MEDIUM

CROSS-REFERENCE TO RELATED APPLICATION

The present application is a U.S. National Phase Entry of International Patent Application No. PCT/CN2022/109922, filed on Aug. 3, 2022, which claims priority of the Chinese Patent Application No. 202110931865.X, filed on Aug. 13, 2021 and titled "IMAGE PROCESSING METHOD, APPARATUS, DEVICE AND STORAGE MEDIUM", the disclosures of which are incorporated herein by reference in their entireties.

TECHNICAL FIELD

The present disclosure relates to the field of data processing, and in particular to an image processing method, an apparatus, a device and a storage medium.

BACKGROUND

With the development of computer technology, people have higher and higher demand for image processing. For example, objects, such as background sundries, clothing wrinkles and stains, etc., in the image generally have an impact on the overall aesthetics of the image. For this reason, users usually have an image processing demand of erasing the above-mentioned objects from the image.

In addition, while erasing the above-mentioned objects, it is also necessary to fill in image contents at the positions where the objects are erased, so as to ensure the overall processing effect of the image.

Therefore, there is an urgent need for an image processing method capable of realizing the above-mentioned image processing function, so as to meet the image processing demands of users.

SUMMARY

In order to solve the above technical problem or at least partially solve the above technical problem, the present disclosure provides an image processing method, an apparatus, a device and a storage medium. The image processing function of filling contents after erasing a specific object on an image can obtain a relatively fine image processing effect.

In a first aspect, the present disclosure provides an image processing method, which includes:

determining, based on a smear region in an image to be processed, a target image from the image to be processed;

constructing, by taking the target image as an image of a bottom layer, an image pyramid for the target image; the image pyramid includes at least two image layers arranged in an ascending order of resolution from a top layer to the bottom layer;

performing a matching updating process on an image of each layer in the image pyramid in an order from the top layer to the bottom layer, sequentially; the matching updating process includes:

determining an input image of a current layer;

determining a patch to be matched on the input image of the current layer;

determining, on the input image of the current layer, a target patch corresponding to the patch to be matched based on similarity matching;

updating the input image of the current layer based on the target patch to obtain an updated image; the updated image is used for determining an image of a lower layer;

generating, after the matching updating process is completed for the image of each layer in the image pyramid, a target effect image corresponding to the image to be processed based on an updated image corresponding to the image of the bottom layer in the image pyramid.

In an optional implementation, determining the patch to be matched on the input image of the current layer includes:

determining a target pixel point in the input image of the current layer;

determining, on the input image of the current layer, the patch to be matched based on the target pixel point;

correspondingly, updating the input image of the current layer based on the target patch to obtain the updated image includes:

updating a value of the target pixel point in the input image of the current layer to obtain the updated image based on a value of a pixel point, which corresponds to the target pixel point, in the target patch.

In an optional implementation, determining, on the input image of the current layer, the patch to be matched based on the target pixel point includes:

determining, on the input image of the current layer, the patch to be matched with the target pixel point as a center point.

In an optional implementation, determining, on the input image of the current layer, the target patch corresponding to the patch to be matched based on the similarity matching includes:

determining, on the input image of the current layer, an initial patch corresponding to the patch to be matched, and performing an iterative matching process; the iterative matching process includes:

calculating a similarity value between the initial patch and the patch to be matched;

taking the initial patch as a starting point, determining an adjacent candidate patch according to a preset propagation mode, sequentially, and calculating a similarity value between the adjacent candidate patch and the patch to be matched until an iteration number reaches a preset maximum iteration number;

determining a patch with a maximum similarity value to the patch to be matched as the target patch corresponding to the patch to be matched.

In an optional implementation, before determining the patch with the maximum similarity value to the patch to be matched as the target patch corresponding to the patch to be matched, the method further includes:

re-determining, on the input image of the current layer, the initial patch corresponding to the patch to be matched, and performing the iterative matching process again.

In an optional implementation, the smear region in the image to be processed is stored in an Alpha channel of the image of each layer in the image pyramid.

In an optional implementation, the input image of the current layer includes a preset number of image regions, and updating the input image of the current layer based on the target patch to obtain the updated image includes:

updating, based on the target patch, pixel values of pixel points in each image region in the input image of the current layer, sequentially, to obtain the updated image.

In an optional implementation, determining the input image of the current layer includes:

determining an updated image corresponding to an input image of an upper layer;

enlarging, based on a resolution proportional relationship between the image of the current layer and an image of the upper layer in the image pyramid, the updated image to obtain an enlarged image;

determining the enlarged image as the input image of the current layer.

In a second aspect, the present disclosure provides an image processing apparatus, including:

a first determining module, configured to determine, based on a smear region in an image to be processed, a target image from the image to be processed;

a constructing module, configured to construct, by taking the target image as an image of a bottom layer, an image pyramid for the target image; the image pyramid includes at least two image layers arranged in an ascending order of resolution from a top layer to the bottom layer;

a triggering module, configured to trigger a matching updating module for an image of each layer in the image pyramid in an order from the top layer to the bottom layer, sequentially;

the matching updating module, configured to determine an input image of a current layer, and determine a patch to be matched on the input image of the current layer;

determine, on the input image of the current layer, a target patch corresponding to the patch to be matched based on similarity matching; and update the input image of the current layer based on the target patch to obtain an updated image; the updated image is used for determining an image of a lower layer;

a generating module, configured to generate, after a function of the matching updating module is performed on the image of each layer in the image pyramid, a target effect image corresponding to the image to be processed based on an updated image corresponding to the image of the bottom layer in the image pyramid.

In a third aspect, the present disclosure provides a computer-readable storage medium, instructions are stored on the computer-readable storage medium, and the instructions, upon being executed by a terminal device, cause the terminal device to implement the above-described method.

In a fourth aspect, the present disclosure provides a device, including: a memory, a processor, and computer program that is stored on the memory and executable on the processor, the processor, upon executing the computer program, implements the above-described method.

In a fifth aspect, the present disclosure provides a computer program product, the computer program product includes computer program/instructions, the computer program/instructions, when executed by a processor, implement the above-described method.

Compared with the prior art, the technical solutions provided by embodiments of the present disclosure have at least the following advantages.

Embodiments of the present disclosure provide an image processing method. Firstly, based on a smear region in an image to be processed, a target image is determined from the image to be processed. Then, by taking the target image as an image of a bottom layer, an image pyramid is constructed for the target image. In an order from a top layer to the bottom layer, a matching updating process is performed on an image of each layer in the image pyramid, sequentially. Specifically, a patch to be matched is determined on an input image of a current layer, and a target patch corresponding to the patch to be matched is determined on the input image of the current layer based on similarity matching. Further, the input image of the current layer is updated based on the target patch to obtain an updated image, which is used for determining an image of a lower layer. The matching updating process is performed on the image of each layer in the image pyramid in the above manner. Finally, based on an updated image corresponding to the image of the bottom layer in the image pyramid, a target effect image corresponding to the image to be processed is generated.

It can be seen that in the embodiments of the present disclosure, patch matching is performed on the image of each layer in the image pyramid based on similarity, so as to realize filling of contents in the image of each layer. In addition, in the embodiments of the present disclosure, the image pyramid is utilized to transfer image processing information from the low-resolution image of the top layer to the high-resolution image of the bottom layer, and the image processing function of filling contents after erasing the specific object on the image can obtain the relatively fine image processing effect.

BRIEF DESCRIPTION OF DRAWINGS

The drawings are used to provide a further understanding of the present disclosure and constitute a part of the specification. The drawings are used to explain the present disclosure together with embodiments of the present disclosure and do not constitute a limitation of the present disclosure. In the drawings.

DETAILED DESCRIPTION

To provide a clearer understanding of the objectives, features, and advantages of the embodiments of the present disclosure, the solutions in the embodiments of the present disclosure will be further described below. It should be noted that the embodiments in the present disclosure and features in the embodiments may be combined with one another without conflict.

Many specific details are described below to help fully understand the embodiments of the present disclosure. However, the embodiments of the present disclosure may also be implemented in other manners different from those described herein. Apparently, the described embodiments in the specification are merely some rather than all of the embodiments of the present disclosure.

At present, it is a demand for image processing to erase a specific object on an image and fill in image contents at the position where the specific object is erased.

For example, background sundries (e.g., trash cans, telegraph poles, etc.), clothing wrinkles, stains, etc., on the image can be erased by the above image processing method, so as to improve the overall aesthetics of the image.

In order to realize the above image processing function, embodiments of the present disclosure provide an image processing method. Firstly, based on a smear region in an image to be processed, a target image is determined from the image to be processed. Then, by taking the target image as an image of a bottom layer, an image pyramid is constructed for the target image. In an order from a top layer to the bottom layer, a matching updating process is performed on an image of each layer in the image pyramid, sequentially. Specifically, a patch to be matched is determined on an input image of a current layer, and a target patch corresponding to the patch to be matched is determined on the input image of the current layer based on similarity matching. Further, the input image of the current layer is updated based on the target patch to obtain an updated image, which is used for determining an image of a lower layer. The matching updating process is performed on the image of each layer in the image pyramid in the above manner. Finally, based on an updated image corresponding to the image of the bottom layer in the image pyramid, a target effect image corresponding to the image to be processed is generated.

It can be seen that in the embodiments of the present disclosure, patch matching is performed on the image of each layer in the image pyramid based on similarity, so as to realize filling of contents in the image of each layer. In addition, in the embodiments of the present disclosure, the image pyramid is utilized to transfer image processing information from the low-resolution image of the top layer to the high-resolution image of the bottom layer, and the image processing function of filling contents after erasing the specific object on an image can obtain a relatively fine image processing effect.

Figure 1:
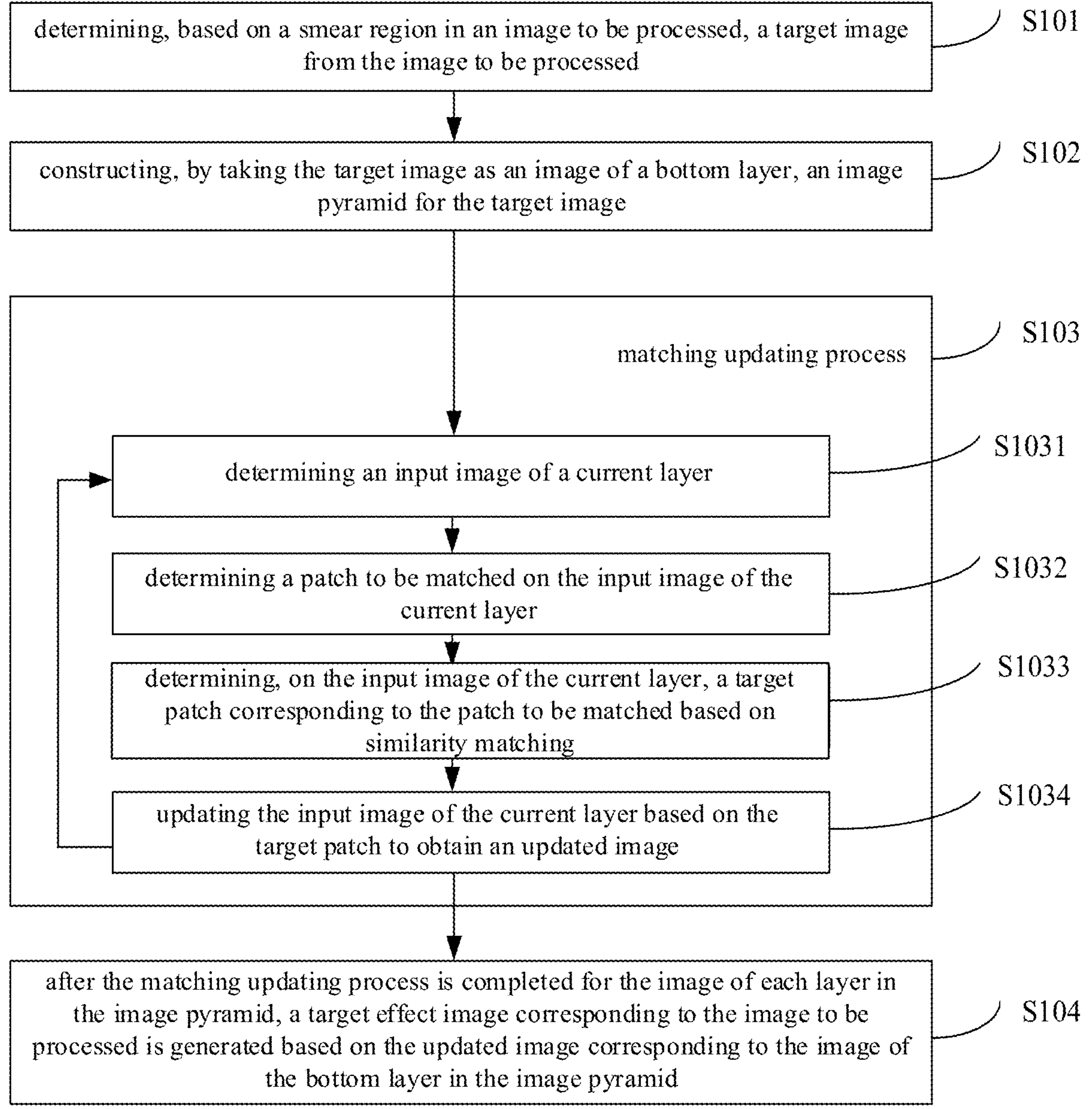
FIG. 1 is a flowchart of an image processing method provided by embodiments of the present disclosure.

Based on this, embodiments of the present disclosure provide an image processing method. Referring to FIG. 1, which is a flowchart of an image processing method provided by embodiments of the present disclosure, the method includes:

S101: determining, based on a smear region in an image to be processed, a target image from the image to be processed.

In the embodiments of the present disclosure, the image to be processed can be any image, such as a landscape image, etc.

In practical applications, after the image to be processed is determined, the smear region in the image to be processed is firstly determined, and then the target image is determined from the image to be processed based on the smear region. The smear region can be a region that is determined based on a smear trajectory of a user on the image to be processed.

In an alternative implementation, assuming that there is a need to erase a specific object from the image to be processed, users can perform a smear operation on the image to be processed for the specific object and obtain the smear trajectory corresponding to the smear operation. Then, based on the smear region corresponding to the smear trajectory, the target image is determined from the image to be processed.

Figure 2:
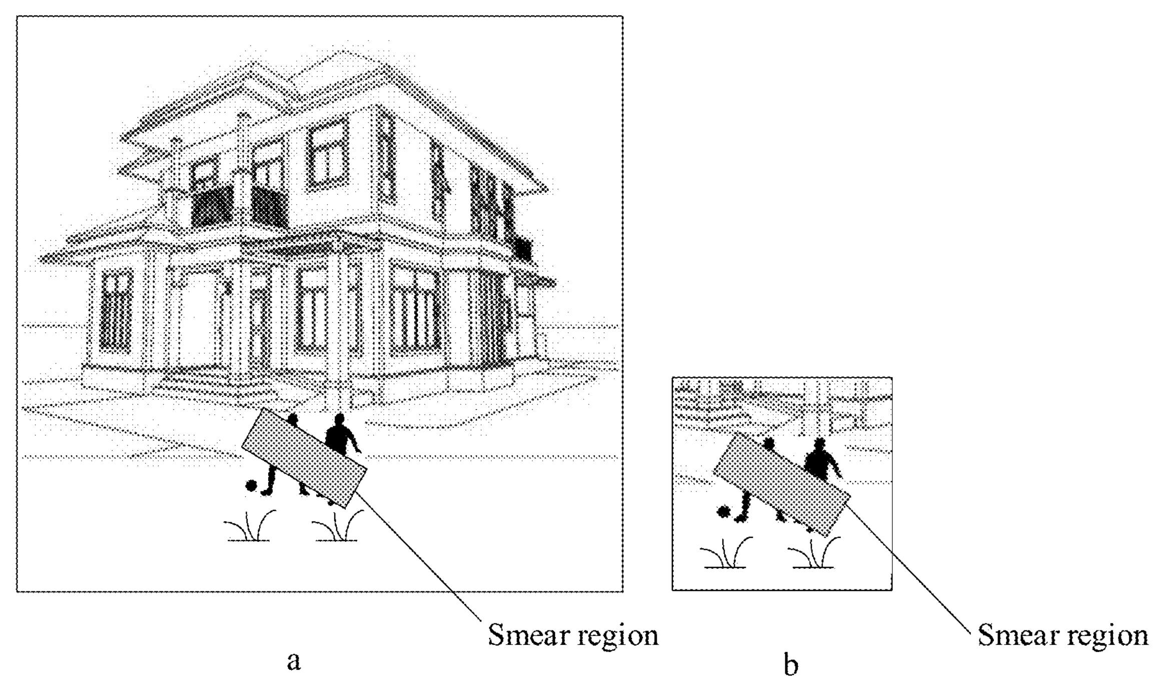
FIG. 2 is a schematic diagram of a determining process of a target image provided by embodiments of the present disclosure.

As shown in FIG. 2, which is a schematic diagram of a determining process of a target image provided by embodiments of the present disclosure, a is an image to be processed, and the image to be processed includes a smear region; b is a target image determined from a based on the smear region in a. It can be seen that the target image not only includes the smear region, but also includes image information around the smear region.

In the embodiments of the present disclosure, the region of the target image is usually determined based on a circumscribed rectangle of the smear region, and the region of the target image can be a rectangular region containing the circumscribed rectangle, such as a rectangular region of which the side lengths are respectively three times the corresponding side lengths of the circumscribed rectangle. The embodiments of the present disclosure do not limit the size relationship between the region of the target image and the smear region. The larger the region of the target image, the better the image processing effect, and correspondingly, the lower the image processing efficiency. In practical applications, the size relationship between the region of the target image and the smear region can be determined based on needs.

S102: constructing, by taking the target image as an image of a bottom layer, an image pyramid for the target image.

The image pyramid includes at least two image layers arranged in an ascending order of resolution from a top layer to the bottom layer (that is, from top to bottom).

In the embodiments of the present disclosure, after the target image is determined, an image pyramid is constructed for the target image, so that the image processing function can be realized subsequently based on the image pyramid of the target image.

In practical applications, constructing the image pyramid for the target image specifically includes: taking an original image of the target image as the image of the bottom layer, and assuming that it is an N-th image layer; downsampling the image of the bottom layer to obtain an image of which the image resolution is half of the resolution of the image of the bottom layer, taking this image as an image of an upper layer of the image of the bottom layer, and assuming that it is the (N−1)-th image layer; in the above manner, downsampling the (N−1)-th image layer to obtain an image of which the image resolution is half of the resolution of (N−1)-th image layer, and taking this image as the (N−2)-th image layer; based on the above manner, the image layer is continuously downsampled, so as to obtain an image pyramid with N image layers. It is worth noting that the number N of layers of the constructed image pyramid can be set based on needs or can be set based on the processing capability of hardware devices, which is not limited here.

Figure 3:
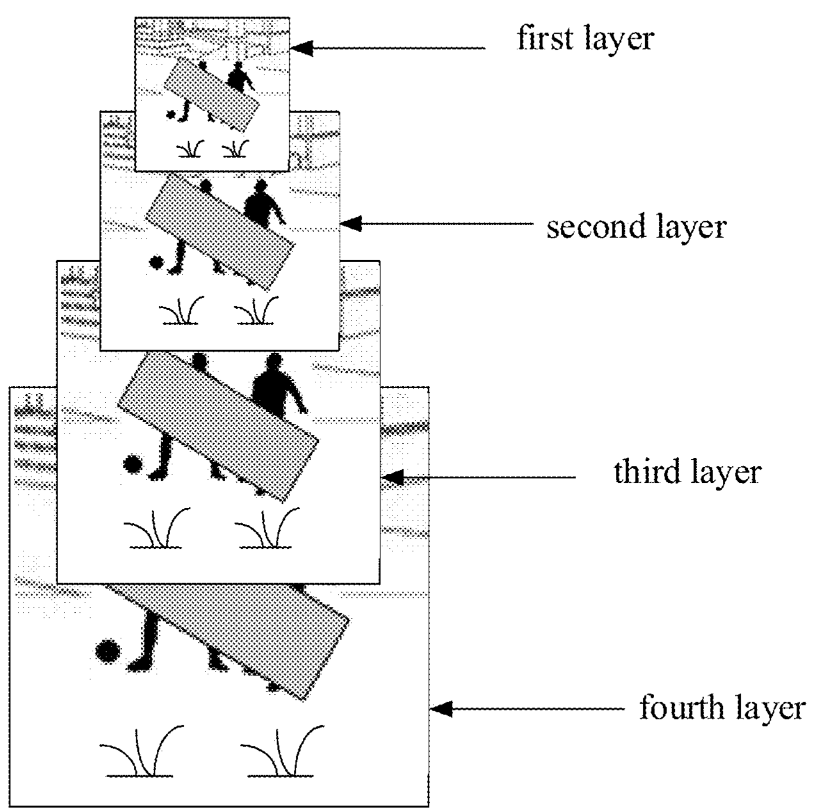
FIG. 3 is a schematic diagram of an image pyramid of the target image provided by embodiments of the present disclosure.

As shown in FIG. 3, which is a schematic diagram of an image pyramid of a target image provided by embodiments of the present disclosure, the image pyramid of the target image has four image layers, and the image resolution of the fourth image layer is the highest. According to an arrangement manner in the ascending order of image resolution from top to bottom, the first image layer, that is, the image of the top layer, has the lowest image resolution.

In addition, in the construction manner of the above image pyramid, the resolution of the image of the upper layer is half the resolution of the image of the current layer. In fact, the embodiments of the present disclosure do not limit the construction manner of the image pyramid, and the resolutions of two adjacent image layers can also have other relationships. For example, the resolution of the image of the upper layer is a quarter of the resolution of the image of the current layer, which will not be described in detail here.

In the embodiments of the present disclosure, after the image pyramid is constructed for the target image, the image processing function is realized based on the image pyramid. Specifically, for the image of each layer in the image pyramid, a matching updating process is performed in a processing order from the top layer to the bottom layer (that is, from low resolution to high resolution), sequentially. The matching updating process is used to realize the processing of the image of each layer in the image pyramid.

In an order from the top layer to the bottom layer, the matching updating process S301 is performed on the image of each layer in the image pyramid, sequentially. The matching updating process includes:

S1031: determining an input image of a current layer.

In the embodiments of the present disclosure, after the image pyramid of the target image is determined, the image of the top layer in the image pyramid, that is, the image layer with the lowest resolution, is firstly obtained. The image of the top layer is determined as the input image of the current layer.

In an alternative implementation, the resolution of the image of the current layer in the image pyramid is greater than the resolution of the image of the upper layer. Therefore, for the image of the current layer that is not the image of the top layer, after the updated image corresponding to the image of the upper layer is obtained, the updated image needs to be enlarged to obtain an enlarged image as the input image of the current layer.

Specifically, an updated image corresponding to the input image of the upper layer is firstly determined. Then, based on the resolution proportional relationship between the image of the current layer and the image of the upper layer in the image pyramid, the updated image is enlarged to obtain an enlarged image. Furthermore, the enlarge image is determined as the input image of the current layer.

The matching updating process further includes S1032: determining a patch to be matched on the input image of the current layer.

In the embodiments of the present disclosure, after the input image of the current layer is determined, the patch to be matched on the input image of the current layer is determined. The patch to be matched can include continuous M*N pixel points on the current input image the layer. The patch to be matched can also be referred to as an image block.

Specifically, the input image of the current layer can include a plurality of patches to be matched. The manner of determining the patch to be matched is not limited in the embodiments of the present disclosure.

In an alternative implementation, a target pixel point in the input image of the current layer is firstly determined. Then, on the input image of the current layer, the patch to be matched is determined based on the target pixel point. Specifically, the patch to be matched including the target pixel point can be determined on the input image of the current layer. The target pixel point can be any pixel point in the input image of the current layer.

In an alternative implementation, the patch to be matched can be determined on the input image of the current layer with the target pixel point being a center point.

It can be understood that a plurality of patches to be matched can be determined based on the input image of the current layer. In order to improve the image processing efficiency, the plurality of patches to be matched can be subsequently processed in parallel.

The matching updating process further includes S1033: determining, on the input image of the current layer, a target patch corresponding to the patch to be matched based on similarity matching.

Since the target image includes the erased smear region, in order to ensure the image processing effect, the embodiments of the present disclosure draw the target image based on similarity matching, so that the smear region in the target image can be filled with the image contents determined based on similarity matching, thus avoiding the abrupt display effect of the target image on the image to be processed and improving the overall aesthetics of the image to be processed.

Figure 4:
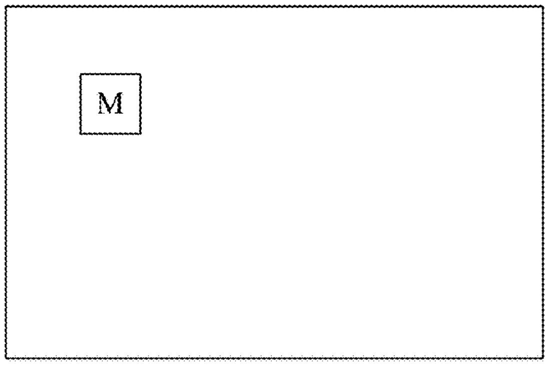
FIG. 4 is a schematic diagram of an iterative matching process provided by embodiments of the present disclosure.
Figure 4:
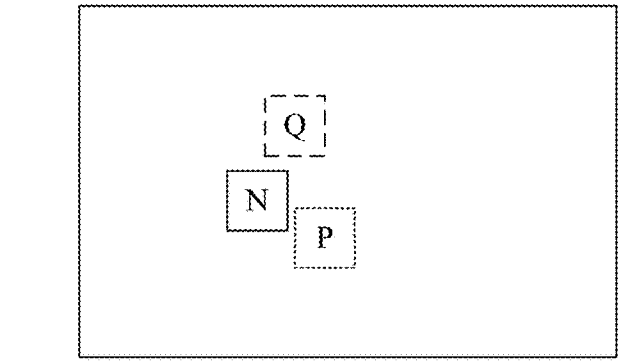

In practical applications, for any patch to be matched, an initial patch corresponding to the patch to be matched is firstly determined on the input image of the current layer. In an alternative implementation, an image can be copied from the input image of the current layer in advance. It is assumed that the input image of the current layer is A, and the image copied from A is B, as shown in FIG. 4. For a patch M to be matched determined on A, firstly, an initial patch N is randomly determined on B, and a similarity value between the initial patch N and the patch M to be matched is calculated. Then, taking the initial patch N as a starting point, an adjacent candidate patch P of the initial patch N is determined according to a preset propagation mode, and a similarity value between the adjacent candidate patch P and the patch to be matched is continuously calculated. An adjacent candidate patch continues to be iteratively determined in the above manner, and the similarity value between the determined adjacent candidate patch and the patch M to be matched until the iteration number reaches a preset maximum iteration number, and then the similarity matching for the patch M to be matched is stopped. Finally, the patch corresponding to the maximum similarity value among the similarity values obtained by each iteration, assuming being a patch Q, is determined as the target patch corresponding to the patch M to be matched. The above processing flow for the patch M to be matched can be referred to as an iterative matching process.

Specifically, the embodiments of the present disclosure do not limit the method of calculating the similarity value between the patch M to be matched and any other patch, and for example, it can be a method of calculating the sum of squared differences (SSD), a method of calculating the Euclidean distance, etc.

In addition, in order to improve image processing efficiency, before calculating the similarity value, it is firstly determined whether the patch, the similarity value between which and the patch M to be matched is calculated, is in the smear region. Since the pixel value of the pixel point in the smear region is 0, it cannot be used to update the input image of the current layer. Therefore, if it is determined that this patch is in the smear region, the calculation of the similarity value may not be performed, and a next adjacent candidate patch can continue to be searched.

In the above implementation, in order to determine whether the patch is in the smear region, it is necessary to store the brush mask corresponding to the smear region in the image to be processed in advance. In order to reduce the memory occupation, the embodiments of the present disclosure can store the brush mask of the smear region in the image to be processed in an Alpha channel of the target image. In practical applications, RGB channels of the target image are used to store the image contents information, while the Alpha channel is usually idle. Therefore, the embodiments of the present disclosure can utilize the Alpha channel to store the brush mask corresponding to the smear region. Specifically, for the image of each layer in the image pyramid, the Alpha channel of the target image can be used to store the brush mask corresponding to the smear region in this image layer.

In an alternative implementation, in the above iterative matching process, the preset propagation mode of the adjacent candidate patch is determined by taking the initial patch N as the starting point, specifically, the adjacent candidate patch can be determined sequentially and circularly around the initial patch N in four directions of "up, down, left and right". For other preset propagation modes, propagation can be, for example, in two directions of "left and right" or "up and down", without being limited in the embodiments of the present disclosure.

In order to avoid the occurrence of the local optimal solution, the embodiments of the present disclosure, on the basis of the implementation described in FIG. 4, re-determine an initial patch R on the input image of the current layer for the patch M to be matched. According to the above iterative matching process, a patch S with the maximum similarity value to the patch M to be matched is determined for the initial patch R. That is to say, the patch Q and the patch S respectively belong to different regions in the input image of the current layer and have the maximum similarity with the patch M to be matched therein.

In addition, in the embodiments of the present disclosure, on the basis of obtaining the patch Q and the patch S, an initial patch can be further re-determined, so as to obtain a patch with the maximum similarity to the patch M to be matched in other regions in the input image of the current layer.

In practical applications, the number of iterative matching processes, which is performed for the patch M to be matched, can be set. Usually, when the above iterative matching process is performed twice for the patch M to be matched, the occurrence of the local optimal solution can be avoided.

In the embodiments of the present disclosure, after the patches (e.g., the patch Q and the patch S) with relatively large similarity values to the patch M to be matched on the input image of the current layer are determined, the patch with the maximum similarity value is determined as the target patch corresponding to the patch M to be matched.

The matching updating process further includes S1034: updating the input image of the current layer based on the target patch to obtain an updated image; the updated image is used for determining an image of a lower layer.

In the embodiments of the present disclosure, after the target patch with the maximum similarity value to the patch to be matched is determined, the input image of the current layer is updated based on the target patch to obtain the updated image corresponding to the input image of the current layer.

In an alternative implementation, the patch to be matched corresponding to the target patch is determined based on the target pixel point. The similarity value between the target patch and the patch to be matched is high, indicating that the overall similarity between the pixel points in the target patch and the pixel points in the patch to be matched is high. Therefore, the embodiments of the present disclosure can update the pixel values of the pixel points in the patch to be matched by using the pixel values of the pixel points in the target patch.

In an alternative implementation, the pixel point in the target patch that has a positional correspondence with the target pixel point of the patch to be matched is determined, assuming that it is pixel point A, and the pixel value of the target pixel point in the input image of the current layer can be updated by using the pixel value of the pixel point A. According to the above manner, the pixel value of each pixel point in the input image of the current layer is updated, so as to realize the overall update of the input image of the current layer.

In the embodiments of the present disclosure, after the update of the input image of the current layer is completed, the updated image corresponding to the input image of the current layer is obtained. Then, according to the resolution proportional relationship between the image of the current layer and the image of the upper layer in the image pyramid, the updated image is enlarged to obtain an enlarged image as the image of the lower layer, so as to process the target image in the image pyramid layer by layer.

Returning to FIG. 1, in step S104, after the matching updating process is completed for the image of each layer in the image pyramid, a target effect image corresponding to the image to be processed is generated based on the updated image corresponding to the image of the bottom layer in the image pyramid.

Different image layers of the image pyramid can express the contents of the target image from different degrees of fineness. The image of the top layer has a low resolution and can express the overall contour of the object on the target image, while the image of the bottom layer has a high resolution and can express the details of the object on the target image. The embodiments of the present disclosure process the image of each layer in the image pyramid, and can realize the restoration of the target image from different scales. Appropriate boundary contour information can be obtained from the image of the upper layer with low resolution, and detailed texture information can be improved from lower image layer with high resolution, thus ensuring the stability of texture transition and edge connection in the target effect image.

In the embodiments of the present disclosure, the image pyramid is utilized to transfer the image processing information from the low-resolution image of the top layer to the high-resolution image of the bottom layer. The updated image corresponding to the image of the bottom layer of the image pyramid is obtained based on the processing results of the image of each layer of the image pyramid, which can reflect the processing effect of the image of each layer on the target image. Therefore, the embodiments of the present disclosure can generate the target effect image corresponding to the image to be processed based on the updated image corresponding to the image of the bottom layer in the image pyramid.

In an alternative implementation, after the updated image corresponding to the image of the bottom layer in the image pyramid is determined, the updated image can be fused with the original image of the image to be processed through texture synthesis, so as to ensure that the resolution of the obtained target effect image is the same as the resolution of the original image of the image to be processed, and avoid the occurrence of the distortion effect of the target effect image.

Figure 5:
FIG. 5 is a schematic diagram of a target effect image provided by embodiments of the present disclosure.

Referring to FIG. 5, which is a schematic diagram of a target effect image provided by embodiments of the present disclosure, compared with the image to be processed shown in FIG. 2, in the target effect image shown in FIG. 5, not only the specific object (i.e., the persons playing football) in the target image is erased, but also filling contents in the region, where the specific object is erased, is realized. In addition, in the embodiments of the disclosure, filling contents based on similarity matching is realized, thus ensuring the overall aesthetics of the target effect image and improving the user experience.

In the image processing method provided by the embodiments of the present disclosure, firstly, based on the smear region in the image to be processed, the target image is determined from the image to be processed. Then, by taking the target image as the image of the bottom layer, the image pyramid is constructed for the target image. In the order from the top layer to the bottom layer, the matching updating process is performed on the image of each layer in the image pyramid, sequentially. Specifically, the patch to be matched is determined on the image of the current layer, and the target patch corresponding to the patch to be matched is determined on the input image of the current layer based on similarity matching. Further, the input image of the current layer is updated based on the target patch to obtain the updated image, which is used for determining the image of a lower layer. The matching updating process is performed on the image of each layer in the image pyramid in the above manner. Finally, based on the updated image corresponding to the image of the bottom layer in the image pyramid, the target effect image corresponding to the image to be processed is generated.

It can be seen that in the embodiments of the present disclosure, patch matching is performed on the image of each layer in the image pyramid based on similarity, so as to realize filling of contents in the image of each layer. In addition, in the embodiments of the present disclosure, the image pyramid is utilized to transfer image processing information from the low-resolution image of the top layer to the high-resolution image of the bottom layer, and the image processing function of filling contents after erasing the specific object on the image can obtain the relatively fine image processing effect.

Based on the above embodiments, for a high-resolution image to be processed, the embodiments of the present disclosure can construct the image pyramid by reducing the resolution. Specifically, the image of the bottom layer of the image pyramid is an image with a reduced resolution, rather than the original image of the target image, thus reducing the computing and memory pressure of the system.

In addition, in the embodiments of the present disclosure, after the updated image corresponding to the image of the bottom layer in the image pyramid is obtained, the updated image can be texture fused with the original image of the target image, so as to ensure that the obtained target effect image is not distorted.

In an alternative implementation, the execution process of the matching updating process of each patch to be matched on the target image is independent of each other. Therefore, in the embodiments of the present disclosure, the target image can be further divided into a preset number of image regions. Then, taking each image region as a unit, the matching updating process is performed on the patch to be matched in each region, sequentially, until the matching updating process has been performed for all regions, and finally the image processing process is realized.

In the execution process of the matching updating process, the input image of the current layer is divided into a preset number of image regions. Based on the determined target patch, pixel values of pixel points in each image region in the image of the current layer are updated sequentially until all image regions have been updated, and the updated image corresponding to the input image of the current layer is obtained.

The above processing method can reduce the computing pressure of the system, improve the fluency of the iterative algorithm in the matching updating process, improve the fluency of displaying the target effect image for users, and avoid the lag phenomenon in the display process.

Figure 6:
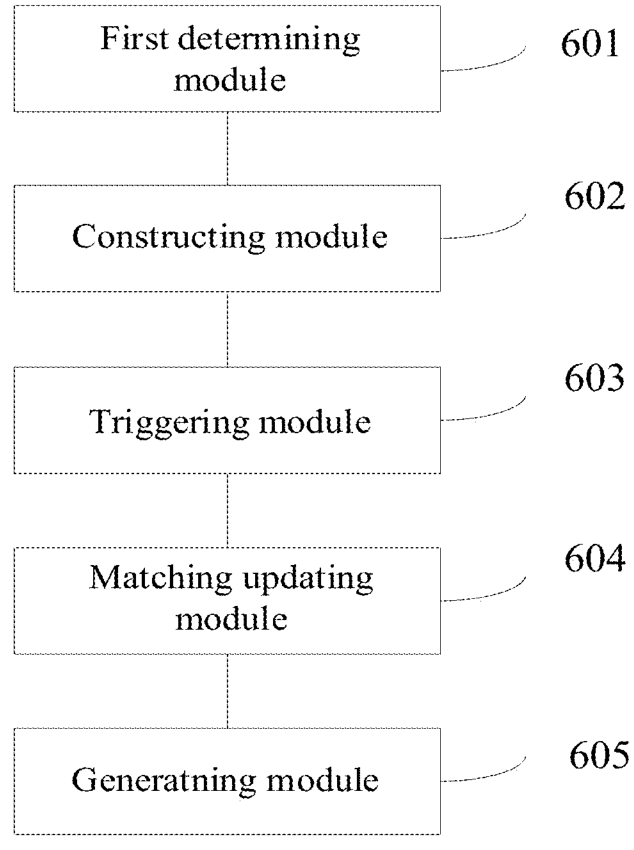
FIG. 6 is a schematic structural diagram of an image processing apparatus provided by embodiments of the present disclosure.

Based on the above method embodiments, embodiments of the present disclosure further provide an image processing apparatus. Referring to FIG. 6, which is a schematic structural diagram of an image processing apparatus provided by embodiments of the present disclosure, the apparatus includes:

a first determining module 601, configured to determine, based on a smear region in an image to be processed, a target image from the image to be processed;

a constructing module 602, configured to construct, by taking the target image as an image of a bottom layer, an image pyramid for the target image; the image pyramid includes at least two image layers arranged in an ascending order of resolution from a top layer to the bottom layer;

a triggering module 603, configured to trigger a matching updating module 604 for an image of each layer in the image pyramid in an order from the top layer to the bottom layer, sequentially;

the matching updating module 604, configured to determine an input image of a current layer, and determine a patch to be matched on the input image of the current layer; determine, on the input image of the current layer, a target patch corresponding to the patch to be matched based on similarity matching; and update the input image of the current layer based on the target patch to obtain an updated image; the updated image is used for determining an image of a lower layer;

a generating module 605, configured to generate, after a function of the matching updating module is performed on the image of each layer in the image pyramid, a target effect image corresponding to the image to be processed based on an updated image corresponding to the image of the bottom layer in the image pyramid.

In an alternative implementation, the matching updating module includes:

a first determining sub-module, configured to determine a target pixel point in the input image of the current layer;

a second determining sub-module, configured to determine, on the input image of the current layer, the patch to be matched based on the target pixel point;

a first updating sub-module, configured to update a value of the target pixel point in the input image of the current layer to obtain the updated image based on a value of a pixel point, which corresponds to the target pixel point, in the target patch.

In an alternative implementation, the second determining sub-module can be configured to:

determine, on the input image of the current layer, the patch to be matched with the target pixel point as a center point.

In an alternative implementation, the matching updating module includes:

a third determining sub-module, configured to determine, on the input image of the current layer, an initial patch corresponding to the patch to be matched;

an iterative matching module, configured to calculate a similarity value between the initial patch and the patch to be matched; take the initial patch as a starting point, and determine an adjacent candidate patch according to a preset propagation mode, sequentially, and calculate a similarity value between the adjacent candidate patch and the patch to be matched until an iteration number reaches a preset maximum iteration number; and determine a patch with a maximum similarity value to the patch to be matched as the target patch corresponding to the patch to be matched.

In an alternative implementation, the apparatus further includes:

a fourth determining sub-module, configured to re-determine, on the input image of the current layer, the initial patch corresponding to the patch to be matched, and trigger the iterative matching module again.

In an alternative implementation, the smear region in the image to be processed is stored in an Alpha channel of the image of each layer in the image pyramid.

In an alternative implementation, the input image of the current layer includes a preset number of image regions, and the matching updating module includes: a second updating sub-module, configured to update, based on the target patch, pixel values of pixel points in each image region in the input image of the current layer, sequentially, to obtain the updated image.

In an alternative implementation, the matching updating module includes:

a fifth determining sub-module, configured to determine an updated image corresponding to an input image of an upper layer;

an enlarging sub-module, configured to enlarge, based on a resolution proportional relationship between the image of the current layer and the image of the upper layer in the image pyramid, the updated image to obtain an enlarged image;

a sixth determining sub-module, configured to determine the enlarged image as the input image of the current layer.

The image processing apparatus provided by the embodiments of the present disclosure performs patch matching on the image of each layer in the image pyramid based on similarity, so as to realize filling of contents in the image of each layer. In addition, in the embodiments of the present disclosure, the image pyramid is utilized to transfer image processing information from the low-resolution image of the top layer to the high-resolution image of the bottom layer, and the image processing function of filling contents after erasing the specific object on the image can obtain the relatively fine image processing effect.

In addition to the above method and apparatus, embodiments of the present disclosure further provide a computer-readable storage medium, instructions are stored on the computer-readable storage medium, and the instructions, upon being executed by a terminal device, cause the terminal device to implement the image processing method described in the embodiments of the present disclosure.

Embodiments of the present disclosure further provide a computer program product, which includes computer program or instructions, and the computer program or instructions, when executed by a processor, implement the image processing method described in the embodiments of the present disclosure.

Figure 7:
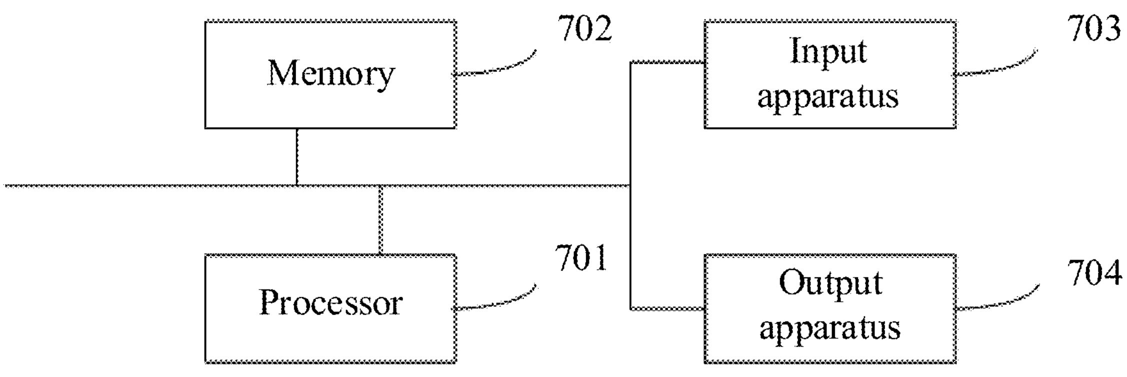
FIG. 7 is a schematic structural diagram of an image processing device provided by embodiments of the present disclosure.

In addition, embodiments of the present disclosure further provide an image processing device, as shown in FIG. 7, which may include:

a processor 701, a memory 702, an input apparatus 703 and an output apparatus 704. The number of the processor 701 in the image processing device may be one or more, and one processor is taken as an example in FIG. 7. In some embodiments of the present disclosure, the processor 701, the memory 702, the input apparatus 703 and the output apparatus 704 may be connected through a bus or other means, and the connection through the bus is taken as an example in FIG. 7.

The memory 702 may be configured to store software programs and modules, and the processor 701 executes various functional applications and data processing of the image processing device by running the software programs and modules stored in the memory 702. The memory 702 may mainly include a program storage region and a data storage region, and the program storage region may store an operating system, application programs required by at least one function, etc. In addition, the memory 702 may include high-speed random-access memory, and may also include non-volatile memory, such as at least one magnetic disk memory, flash memory, or other volatile solid-state memory. The input apparatus 703 may be configured to receive inputted digital or character information and generate signal input related to user settings and function control of the image processing device.

Specifically, in the present embodiment, the processor 701 may follow the following instructions to load executable files corresponding to the processes of one or more application programs into the memory 702, and the processor 701 may run the application programs stored in the memory 702 to realize various functions of the above-mentioned image processing device.

It should be noted that in the present disclosure, relational terms, such as “first” and “second”, etc., are merely used to distinguish one entity or operation from another entity or operation, and do not necessarily require or imply that there is any such factual relationship or order between these entities or operations. Moreover, the terms “including”, “comprising” or any other variation thereof are intended to cover non-exclusive inclusion, so that a process, method, article or device that includes a series of elements includes not only these elements, but also other elements that are not explicitly listed or elements that are inherent to such process, method, article or device. Without further restrictions, an element defined by the phrase “including a/an . . . ” does not exclude the existence of other identical elements in the process, method, article or device that includes the element.

What is described above is only the specific embodiments of the present disclosure, so that those skilled in the art can understand or realize the present disclosure. Many modifications to these embodiments will be obvious to those skilled in the art, and the general principles defined herein may be implemented in other embodiments without departing from the spirit or scope of the present disclosure. Therefore, the present disclosure is not limited to the embodiments described herein, but to be accorded the widest scope that is consistent with the principles and novel features disclosed herein.

The invention claimed is:

1. An image processing method, wherein the method comprises:

determining, based on a smear region in an image to be processed, a target image from the image to be processed;

constructing, by taking the target image as an image of a bottom layer, an image pyramid for the target image; wherein the image pyramid includes at least two image layers arranged in an ascending order of resolution from a top layer to the bottom layer; and performing a matching updating process on an image of each layer in the image pyramid in an order from the top layer to the bottom layer, sequentially; wherein the matching updating process comprises:

determining an input image of a current layer;

determining a patch to be matched on the input image of the current layer;

determining, on the input image of the current layer, a target patch corresponding to the patch to be matched based on similarity matching;

updating the input image of the current layer based on the target patch to obtain an updated image; wherein the updated image is used for determining an image of a lower layer; and generating, after the matching updating process is completed for the image of each layer in the image pyramid, a target effect image corresponding to the image to be processed based on an updated image corresponding to the image of the bottom layer in the image pyramid, wherein the smear region in the image to be processed is stored in an Alpha channel of the image of each layer in the image pyramid.

2. The method according to claim 1, wherein determining the patch to be matched on the input image of the current layer comprises:

determining a target pixel point in the input image of the current layer;

determining, on the input image of the current layer, the patch to be matched based on the target pixel point; and correspondingly, updating the input image of the current layer based on the target patch to obtain the updated image comprises:

updating a value of the target pixel point in the input image of the current layer to obtain the updated image based on a value of a pixel point, which corresponds to the target pixel point, in the target patch.

3. The method according to claim 2, wherein determining, on the input image of the current layer, the patch to be matched based on the target pixel point comprises:

determining, on the input image of the current layer, the patch to be matched with the target pixel point as a center point.

4. The method according to claim 1, wherein determining, on the input image of the current layer, the target patch corresponding to the patch to be matched based on the similarity matching comprises:

determining, on the input image of the current layer, an initial patch corresponding to the patch to be matched, and performing an iterative matching process; wherein the iterative matching process comprises:

calculating a similarity value between the initial patch and the patch to be matched;

taking the initial patch as a starting point, determining an adjacent candidate patch according to a preset propagation mode, sequentially, and calculating a similarity value between the adjacent candidate patch and the patch to be matched until an iteration number reaches a preset maximum iteration number; and determining a patch with a maximum similarity value to the patch to be matched as the target patch corresponding to the patch to be matched.

5. The method according to claim 4, wherein before determining the patch with the maximum similarity value to the patch to be matched as the target patch corresponding to the patch to be matched, the method further comprises:

re-determining, on the input image of the current layer, the initial patch corresponding to the patch to be matched, and performing the iterative matching process again.

6. The method according to claim 1, wherein the input image of the current layer includes a preset number of image regions, and updating the input image of the current layer based on the target patch to obtain the updated image comprises:

updating, based on the target patch, pixel values of pixel points in each image region in the input image of the current layer, sequentially, to obtain the updated image.

7. The method according to claim 1, wherein determining the input image of the current layer comprises:

determining an updated image corresponding to an input image of an upper layer;

enlarging, based on a resolution proportional relationship between the image of the current layer and an image of the upper layer in the image pyramid, the updated image to obtain an enlarged image; and determining the enlarged image as the input image of the current layer.

8. A non-transitory computer-readable storage medium, wherein instructions are stored on the computer-readable storage medium, and the instructions, upon being executed by a terminal device, cause the terminal device to implement the method according to claim 1.

9. Non-transitory computer-readable storage medium according to claim 8, wherein determining the patch to be matched on the input image of the current layer comprises:

determining a target pixel point in the input image of the current layer;

determining, on the input image of the current layer, the patch to be matched based on the target pixel point; and correspondingly, updating the input image of the current layer based on the target patch to obtain the updated image comprises:

updating a value of the target pixel point in the input image of the current layer to obtain the updated image based on a value of a pixel point, which corresponds to the target pixel point, in the target patch.

10. The non-transitory computer-readable storage medium according to claim 9, wherein determining, on the input image of the current layer, the patch to be matched based on the target pixel point comprises:

determining, on the input image of the current layer, the patch to be matched with the target pixel point as a center point.

11. The non-transitory computer-readable storage medium according to claim 8, wherein determining, on the input image of the current layer, the target patch corresponding to the patch to be matched based on the similarity matching comprises:

determining, on the input image of the current layer, an initial patch corresponding to the patch to be matched, and performing an iterative matching process; wherein the iterative matching process comprises:

calculating a similarity value between the initial patch and the patch to be matched;

taking the initial patch as a starting point, determining an adjacent candidate patch according to a preset propagation mode, sequentially, and calculating a similarity value between the adjacent candidate patch and the patch to be matched until an iteration number reaches a preset maximum iteration number; and determining a patch with a maximum similarity value to the patch to be matched as the target patch corresponding to the patch to be matched.

12. The non-transitory computer-readable storage medium according to claim 8, wherein the input image of the current layer includes a preset number of image regions, and updating the input image of the current layer based on the target patch to obtain the updated image comprises:

updating, based on the target patch, pixel values of pixel points in each image region in the input image of the current layer, sequentially, to obtain the updated image.

13. The non-transitory computer-readable storage medium according to claim 8, wherein determining the input image of the current layer comprises:

determining an updated image corresponding to an input image of an upper layer;

enlarging, based on a resolution proportional relationship between the image of the current layer and an image of the upper layer in the image pyramid, the updated image to obtain an enlarged image; and determining the enlarged image as the input image of the current layer.

14. A device, comprising: a memory, a processor, and computer program stored on the memory and executable on the processor, wherein the processor, upon executing the computer program, implements:

determining, based on a smear region in an image to be processed, a target image from the image to be processed;

constructing, by taking the target image as an image of a bottom layer, an image pyramid for the target image; wherein the image pyramid includes at least two image layers arranged in an ascending order of resolution from a top layer to the bottom layer; and performing a matching updating process on an image of each layer in the image pyramid in an order from the top layer to the bottom layer, sequentially; wherein the matching updating process comprises:

determining an input image of a current layer;

determining a patch to be matched on the input image of the current layer;

determining, on the input image of the current layer, a target patch corresponding to the patch to be matched based on similarity matching;

updating the input image of the current layer based on the target patch to obtain an updated image; wherein the updated image is used for determining an image of a lower layer; and generating, after the matching updating process is completed for the image of each layer in the image pyramid, a target effect image corresponding to the image to be processed based on an updated image corresponding to the image of the bottom layer in the image pyramid, wherein the smear region in the image to be processed is stored in an Alpha channel of the image of each layer in the image pyramid.

15. The device according to claim 14, wherein determining the patch to be matched on the input image of the current layer comprises:

determining a target pixel point in the input image of the current layer;

determining, on the input image of the current layer, the patch to be matched based on the target pixel point; and correspondingly, updating the input image of the current layer based on the target patch to obtain the updated image comprises:

updating a value of the target pixel point in the input image of the current layer to obtain the updated image based on a value of a pixel point, which corresponds to the target pixel point, in the target patch.

16. The device according to claim 14, wherein determining, on the input image of the current layer, the patch to be matched based on the target pixel point comprises:

determining, on the input image of the current layer, the patch to be matched with the target pixel point as a center point.

17. The device according to claim 16, wherein before determining the patch with the maximum similarity value to the patch to be matched as the target patch corresponding to the patch to be matched, the method further comprises:

re-determining, on the input image of the current layer, the initial patch corresponding to the patch to be matched, and performing the iterative matching process again.

18. The device according to claim 14, determining, on the input image of the current layer, the target patch corresponding to the patch to be matched based on the similarity matching comprises:

determining, on the input image of the current layer, an initial patch corresponding to the patch to be matched, and performing an iterative matching process; wherein the iterative matching process comprises:

calculating a similarity value between the initial patch and the patch to be matched;

taking the initial patch as a starting point, determining an adjacent candidate patch according to a preset propagation mode, sequentially, and calculating a similarity value between the adjacent candidate patch and the patch to be matched until an iteration number reaches a preset maximum iteration number; and determining a patch with a maximum similarity value to the patch to be matched as the target patch corresponding to the patch to be matched.

19. The device according to claim 14, wherein the input image of the current layer includes a preset number of image regions, and updating the input image of the current layer based on the target patch to obtain the updated image comprises:

updating, based on the target patch, pixel values of pixel points in each image region in the input image of the current layer, sequentially, to obtain the updated image.

20. The device according to claim 14, wherein determining the input image of the current layer comprises:

determining an updated image corresponding to an input image of an upper layer;

enlarging, based on a resolution proportional relationship between the image of the current layer and an image of the upper layer in the image pyramid, the updated image to obtain an enlarged image; and determining the enlarged image as the input image of the current layer.

* * * * *